Oct. 31, 1939.     E. K. CLARK     2,178,065
REMOTE CONTROL DEVICE FOR RANGES
Filed Jan. 29, 1937     2 Sheets-Sheet 1

WITNESSES:
Michael Stark

INVENTOR
Earl K. Clark.
BY
ATTORNEY

Oct. 31, 1939.  E. K. CLARK  2,178,065
REMOTE CONTROL DEVICE FOR RANGES
Filed Jan. 29, 1937  2 Sheets-Sheet 2
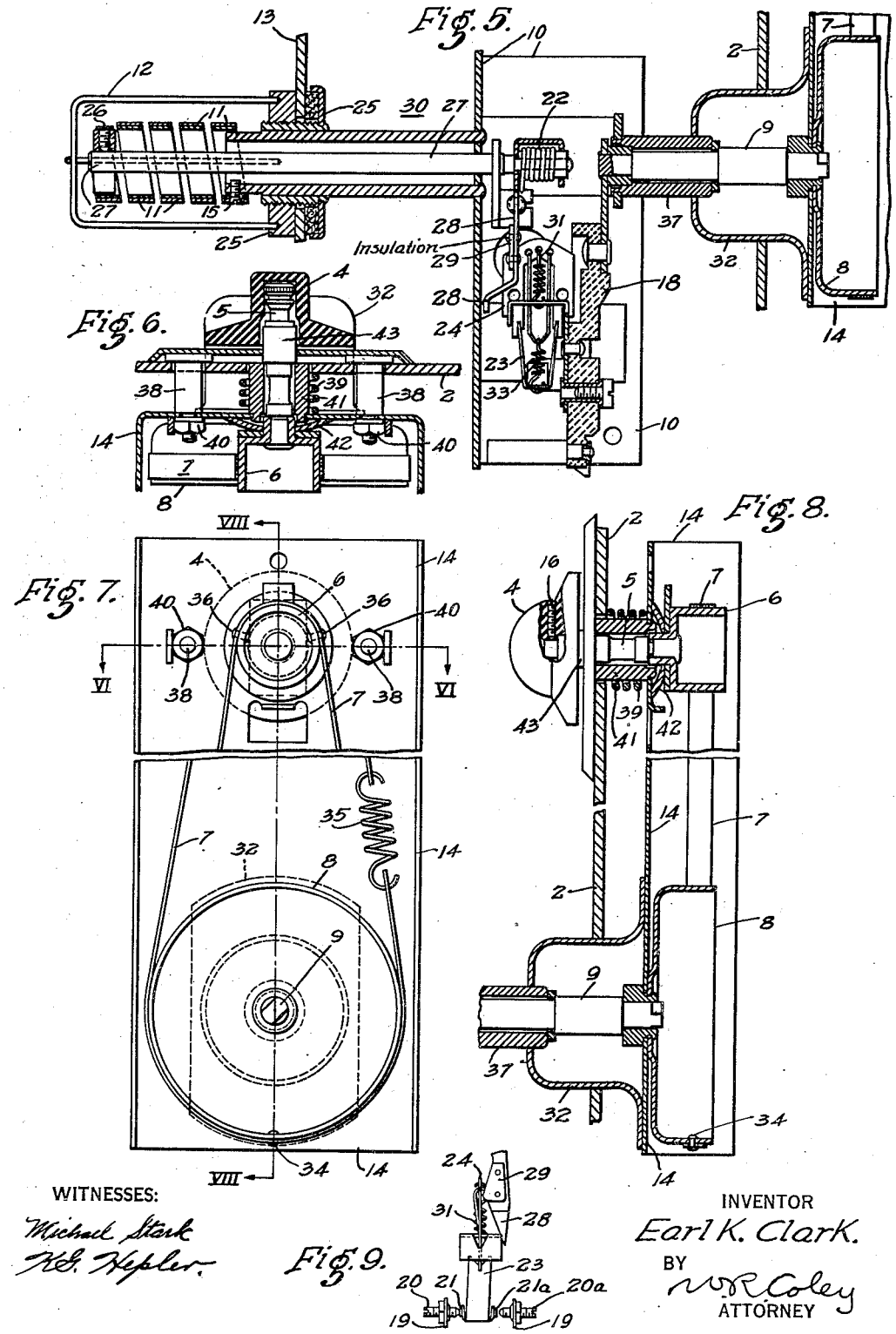
WITNESSES:
Michael Stark
H. E. Hepler
INVENTOR
Earl K. Clark.
BY
W. R. Coley
ATTORNEY Patented Oct. 31, 1939

2,178,065

UNITED STATES PATENT OFFICE 2,178,065

REMOTE CONTROL DEVICE FOR RANGES

Earl K. Clark, West Mansfield, Ohio, assignor to Westinghouse Electric & Manufacturing Company, East Pittsburgh, Pa., a corporation of Pennsylvania Application January 29, 1937, Serial No. 123,003

4 Claims. (Cl. 219—37)

My invention relates to heating appliances and more particularly to the remote control of thermostatic devices which regulate the temperature of such appliances.

In ranges, or the like, having a controllable temperature regulator it has been necessary in many cases to place the control knob therefor in close proximity with such regulator. This limitation has been placed thereon because of the mechanical construction of such regulators which required the control knob to be an integral part thereof. Due to this restriction upon the location of the control knob, the operation thereof has been inconvenient and, in addition, the artistic design of ranges has been retarded and limited in its progress. It is, therefore, an object of my invention to overcome these restrictions by providing a remote control device that will actuate a thermostat placed within the oven and permit the control knob therefor to be placed anywhere on the back splasher or front panels of the range.

It is another object of my invention to provide a thin and compact assembly of the remote control device so that the use thereof will not add to the depth of the range.

Still another object of my invention is to provide means whereby there will be no lost motion between the movements of the control knob and the regulator.

Other objects of my invention will either be pointed out specifically in the course of the following description of a device embodying my invention, or will be apparent from such description.

In the accompanying drawings:

Fig. 5 is a sectional view of a thermostatic device as used with a range.

Fig. 6 is a sectional view taken along line VI—VI of Fig. 7.

Fig. 7 is an elevational view of the control knob and of means for coupling it with a control drum associated with a thermostatic device.

Fig. 8 is a sectional view taken along line VIII—VIII of Fig. 7, and

Fig. 9 is a partial side view of the circuit-controlling device shown in Fig. 5.

Figure 1:
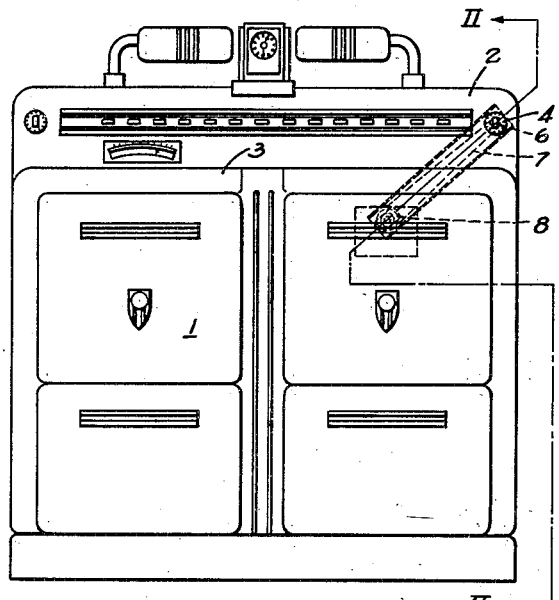
Figure 1 is a front elevational view of a range utilizing my invention with the control knob shown upon the back splasher.
Figure 2:
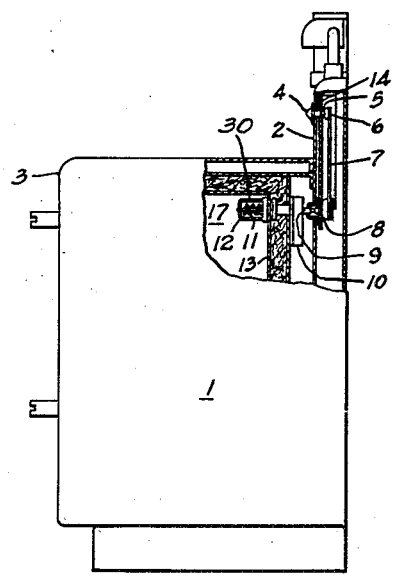
Fig. 2 is a partial sectional view of the range, shown in Fig. 1, taken along line II—II thereof.
Figure 3:
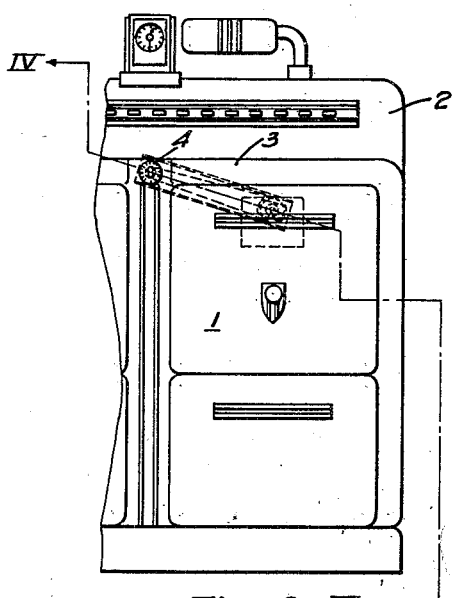
Fig. 3 is a fragmentary front elevational view of the range shown in Fig. 1, except that the control knob is shown as being upon the front switch panel.
Figure 4:
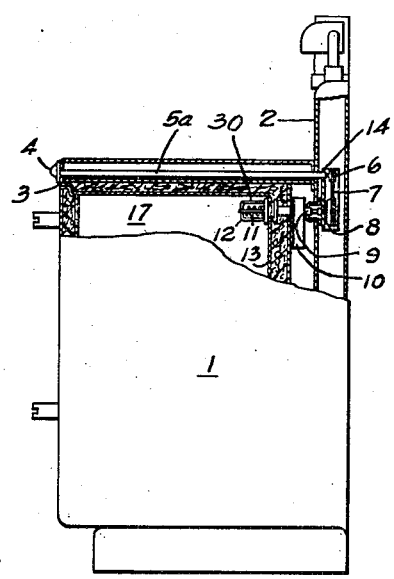
Fig. 4 is a partial sectional view of the range, shown in Fig. 3, taken along line IV—IV thereof.

Referring to Figs. 1, 2, 3 and 4, I show a range 1 of any desirable design having a back splasher 2 and a switch panel 3. A control knob 4 is shown in Fig. 1 as being located upon the back splasher 2 and in Fig. 3 upon the switch panel 3. However, it is to be understood that the exact location of control knob 4, either upon the back splasher 2 or switch panel 3, is to be a matter of individual choice and design. This control knob 4 varies the operating temperature of the thermostatic regulator 30 located within the oven 17 by means of a driving shaft 5 or 5a, driving pulley 6, flexible strap 7, driven pulley 8 and driven shaft 9. As shown in Figs. 2 and 4, the thermostatic device 30 may comprise a bimetallic thermally actuated member 11 and any suitable contacting device located within a box or suitable receptacle 10. A shield 12 of any suitable material and desired construction may be placed about the thermally actuated device 11 as protection therefor.

The control knob 4, which may be of any shape or size and of any desired material, is rigidly attached to drive shaft 5 or 5a by means of a set screw 16. The drive shaft 5 or 5a operates within a drive shaft housing 41 which may be rigidly attached to a control box 14 in any suitable manner. The housing 41 may be loosely inserted through the back splasher 2 permitting the control shaft to be projected through said back splasher and into the control box 14. The control box 14 may be loosely mounted on the back splasher 2 by means of stud bolts 38 and coiled spring 39. The control box 14 may be rigidly mounted upon the stud bolts 38 which may be slidably inserted through back splasher 2, and said control box 14 is prevented from becoming disengaged from said bolts by means of nuts 40 which are placed upon the free ends of the bolts.

A coiled spring 39 may be placed about drive shaft housing 41, biasing control box 14 away from the back splasher 2. Since drive shaft 5 housing 41 is free to move in respect to the back splasher 2 and since control knob 4 is rigidly attached to box 14 through shaft 5 or 5a and housing 41, it is obvious that the back splasher 2 may be moved with respect to the control knob 4 or control box 14 without impairing the operation thereof.

Located within the control box 14 and rigidly attached to the drive shaft 5 or 5a is a driving pulley 6. A resilient member 42 may be placed between the inner wall of control box 14 and said driving pulley 6. This resilient member 42 will then bias the driving pulley away from said control box, and the operatively associated control knob 4 and control shaft 5 or 5a toward the control box. However, the collar 43 of the control shaft 5 or 5a acting as a thrust bearing in contact with housing 41, will prevent the longitudinal movement of the operatively associated control knob and driving pulley.

A flexible strap 7 is placed over and upon the driving pulley 6 and may be rigidly attached thereto by means of small screws 36. This strap 7 extends through the control box 14 and is placed over a driven pulley 8 to which it may be rigidly attached by means of a screw 34. It is understood that the ratio of the size of the driving pulley 6 to the driven pulley 8 may be of any magnitude. However, since it is desirable to keep the angular movement of the control knob within 360° it is preferred that the ratio be approximately 1 to 3. The exact ratio between the driving pulley 6 and the driven pulley 8 is by no means a fixed value but is determined by the inherent characteristics of the thermostatic controlling device.

An equalizing spring 35, as shown in Fig. 7, is inserted in one side of the flexible strap 7 and enables the movements of the control knob to be transmitted to the thermostatic device without any lost motion. The driven shaft 9 is rigidly attached to driven pulley 8 in any suitable manner and is inserted within a shielding device 32, which extends over and is attached to a rigid bushing 37 attached to thermostat receptacle 10, preventing any binding between said shaft 9 and bushing 37. This prevention of binding follows because of the cooperation between shielding device 32 and bushing 37 which prevents any relative transverse movement therebetween as described in more detail below. This driven shaft 9 proceeds within the thermostatic box 10 where it may be rigidly attached to a manually operated arm 18 having a circuit-controlling device located thereon.

When an operator grasps the control knob 4 to adjust the thermostat, such knob and rigidly attached box 14 may be moved with respect to the backsplasher. This action tends to twist or move box 14 and the attached end of shaft 9 with respect to the bushing 37. Were it not for the present invention, there would thus be a binding action between the bushing 37 and shaft 9.

However, since the shielding device 32 is also attached to the box 14, and since such device extends over and is attached to the bushing 37, the bushing, like shaft 9, will move with the box 14, that is, movements of the box and bushing will be coordinated at all times. The bushing 37 will thus remain coaxial with shaft 9 at all times, thereby preventing any binding action therebetween.

The circuit-controlling device located upon the manually operated arm 18 may be composed of a toggle switch arm 24 and a contact arm 23 pivotally mounted thereon, both of which are substantially U-shaped. This circuit-controlling device is snap-acting in action and is made so by the overcenter spring 33. A second spring 31 makes the circuit-controlling device return to its original position when the operating pressure upon the toggle switch arm 24 has been removed.

The pressure on toggle switch arm 24 is transmitted thereto by a small finger 29 composed of any suitable non-conducting material. The finger 29 is permanently and rigidly attached to thermally actuated arm 28 in any suitable manner. This thermally actuated arm 28 may be flexibly attached to the thermally actuated drive shaft 27 by means of helical spring 22 whereby the movements of said drive shaft 27 are transmitted through spring 22, the thermally actuated arm 28 and finger 29, to the circuit-controlling device located upon manually operated arm 18.

Fig. 9 illustrates the relative position of toggle switch arm 24 and contact arm 23 when arm 28 and finger 29 are operatively associated with the toggle switch arm 24. It will be observed that contact 21 located upon arm 23 is then operatively associated with screw contact 20 which is movably attached to bracket 19. As the pressure applied to toggle switch arm 24 is released, contact arm 23 will then snap to its opposite position and contact 21a will then be operatively associated with screw contact 20a.

The bimetallic thermally actuated device 11 may be rigidly attached, at one end, to the rear oven wall 13 by means of any suitable anchoring device 25 and the small screw 15 and at the other end, to the thermally actuated drive shaft 27 by means of a set screw 26 or any other suitable anchoring device.

In order to operate a thermostat for regulating the temperature within a cooking oven or the like, by means of a device utilizing my invention, the control knob is set to the desired value, whereupon the flexible strap 7 operatively associated therewith rotates the driven pulley 8 and operatively associated manually operated arm 18. The rotation of the manually operated arm 18, in turn, adjusts the thermostatic device to a value corresponding to the setting upon the control knob 4. It is, therefore, obvious that by the utilization of my device in conjunction with any desirable thermostatic regulator, the temperature setting thereof may be controlled by a control knob which may be located upon the range in any desired and suitable position. Accordingly, by using my invention, the restriction which has been placed upon the location of the control knobs on ranges is eliminated, and the operating convenience and artistic design of ranges are no longer limited by the restrictions which have required the placement of the control knob upon the range to only a few less desirable positions.

Various modifications may be made in the device embodying my invention without departing from the spirit and scope thereof and I desire that only such limitations shall be placed thereon as are imposed by the prior art and the appended claims.

I claim as my invention:

1. In combination, a back-splasher for a range, a control box wall flexibly supported from said backsplasher, said backsplasher and said box wall having alined apertures therein, a bearing structure extending through said apertures, said structure being secured to said box wall and free to move within the backsplasher aperture, rotatable means journalled within said bearing structure, a pulley secured to said rotatable means on the side of said control box wall remote from said back-splasher, manually operable means disposed adjacent to and spaced from the side of said back-splasher remote from said control box wall for actuating said rotatable means, and a spring interposed between said back-splasher and said control box wall.

2. In combination, a back-splasher for a range, a control box wall flexibly supported from said backsplasher, said backsplasher and said box wall having alined apertures therein, a bearing structure extending through said apertures, said structure being secured to said box wall and free to move within the backsplasher aperture, rotatable means journalled within said bearing structure, a pulley secured to said rotatable means on the side of said control box wall remote from said back-splasher, manually operable means disposed adjacent to and spaced from the side of said back-splasher remote from said control box wall for actuating said rotatable means, a spring interposed between said back-splasher and said control box wall, and a second spring interposed between said control box wall and said pulley.

3. In combination, a back-splasher for a range, a control box wall in the rear thereof and flexibly supported thereby, said back-splasher and said control box wall having alined apertures therein, a bearing structure extending through said apertures, said structure being secured to said box wall and free to move within the back-splasher aperture, a rotatable shaft journalled within said bearing structure, a pulley secured to said shaft on the rear side of said wall, a knob secured to said shaft in front of and spaced from said back-splasher, and a coil spring surrounding said bearing structure and interposed between said back-splasher and said wall.

4. In combination, a back-splasher for a range, a control box wall in the rear thereof and flexibly supported thereby, said back-splasher and said control box wall having alined apertures therein, a bearing structure extending through said apertures, said structure being secured to said box wall and free to move within the back-splasher aperture, a rotatable shaft journalled within said bearing structure, a pulley secured to said shaft on the rear side of said wall, a knob secured to said shaft in front of and spaced from said back-splasher, a coil spring surrounding said bearing structure and interposed between said back-splasher and said wall, and a dished spring interposed between said wall and said pulley.

EARL K. CLARK.